(12) United States Patent
Ferraro

(10) Patent No.: US 7,382,061 B2
(45) Date of Patent: Jun. 3, 2008

(54) SUPERCHARGER COUPLED TO A MOTOR/GENERATOR UNIT

(76) Inventor: Giuseppe Ferraro, Via Direttissima 35 81030, Falciano Del Massico (IT)

( * ) Notice: Subject to any disclaimer, the term of this patent is extended or adjusted under 35 U.S.C. 154(b) by 0 days.

(21) Appl. No.: 10/529,591

(22) PCT Filed: Sep. 30, 2003

(86) PCT No.: PCT/IB03/04311

§ 371 (c)(1),
(2), (4) Date: Sep. 26, 2005

(87) PCT Pub. No.: WO2004/029418

PCT Pub. Date: Apr. 8, 2004

(65) Prior Publication Data

US 2006/0091676 A1 May 4, 2006

(30) Foreign Application Priority Data

Sep. 30, 2002 (IT) .............................. CE02A0009

(51) Int. Cl.
*F01D 15/10* (2006.01)
*F02C 6/00* (2006.01)
*H02K 7/18* (2006.01)
*H02P 9/04* (2006.01)
*F02B 33/44* (2006.01)

(52) U.S. Cl. .............. 290/52; 418/32; 60/608
(58) Field of Classification Search ................ 290/52; 418/32; 60/608
See application file for complete search history.

(56) References Cited

U.S. PATENT DOCUMENTS

| 2,037,402 | A | * | 4/1936 | Taylor | 418/47 |
|---|---|---|---|---|---|
| 2,355,494 | A | * | 8/1944 | Yingling | 418/206.1 |
| 2,393,852 | A | * | 1/1946 | Yingling | 123/41 R |
| 2,414,187 | A | * | 1/1947 | Borsting | 418/32 |
| RE23,015 | E | * | 7/1948 | Yingling | 418/206.1 |
| 2,453,483 | A | * | 11/1948 | Yingling | 105/130 |
| 2,567,636 | A | * | 9/1951 | Cuny | 290/4 B |
| 2,724,338 | A | * | 11/1955 | Roth | 415/55.5 |
| 2,880,689 | A | * | 4/1959 | Bokowski | 440/62 |
| 3,539,045 | A | * | 11/1970 | Sinclair | 477/169 |
| 3,605,406 | A | * | 9/1971 | Woolley | 60/39.182 |
| 3,782,850 | A | * | 1/1974 | Egli et al. | 415/55.3 |
| 3,867,655 | A | | 2/1975 | Stengel et al. | 310/66 |
| 4,253,031 | A | | 2/1981 | Frister | 290/52 |

(Continued)

FOREIGN PATENT DOCUMENTS

AU          113 576 B         7/1941

(Continued)

*Primary Examiner*—Darren Schuberg
*Assistant Examiner*—Pedro J. Cuevas
(74) *Attorney, Agent, or Firm*—Knobbe Martens Olson & Bear LLP

(57) ABSTRACT

A device for handling and recovering of kinetic energy in a fluid is presented which basically features a bladed impeller (11). The impeller is operated by an electric engine (12) and acts as a centrifugal blower yielding energy to the air when the main engine is in a low boost phase; otherwise in case of excessive boost pressure, the impeller receives the moving fluid which will drive its rotation, reducing pressure and absorbing the energy to operate the electric engine (12) which will act as a reversible electric machine, thus generating electric power.

12 Claims, 4 Drawing Sheets

U.S. PATENT DOCUMENTS

| | | | | |
|---|---|---|---|---|
| 4,485,310 A | | 11/1984 | De Valroger | 290/52 |
| 4,745,755 A | * | 5/1988 | Kawamura | 60/608 |
| 4,757,686 A | * | 7/1988 | Kawamura et al. | 60/608 |
| 4,803,376 A | * | 2/1989 | N'Guyen | 290/22 |
| 4,833,887 A | * | 5/1989 | Kawamura et al. | 60/608 |
| 4,935,656 A | | 6/1990 | Kawamura | 310/156.08 |
| 4,955,199 A | * | 9/1990 | Kawamura | 60/608 |
| 4,958,497 A | * | 9/1990 | Kawamura | 60/608 |
| 5,065,063 A | | 11/1991 | Watanabe | 310/156.11 |
| 5,105,624 A | * | 4/1992 | Kawamura | 60/608 |
| 5,121,605 A | * | 6/1992 | Oda et al. | 60/608 |
| 5,140,816 A | | 8/1992 | Scicluna | 60/605.1 |
| 5,207,063 A | * | 5/1993 | Blake | 60/608 |
| 5,577,385 A | | 11/1996 | Kapich | 60/612 |
| 5,586,540 A | * | 12/1996 | Marzec et al. | 123/559.1 |
| 5,899,673 A | * | 5/1999 | Bosley et al. | 417/423.14 |
| 6,079,211 A | * | 6/2000 | Woollenweber et al. | 60/612 |
| 6,082,340 A | * | 7/2000 | Heimark | 123/559.1 |
| 6,170,443 B1 | * | 1/2001 | Hofbauer | 123/51 B |
| 6,202,600 B1 | * | 3/2001 | Miceli | 123/18 R |
| 6,233,935 B1 | * | 5/2001 | Kahlon et al. | 60/605.1 |
| 6,295,974 B1 | * | 10/2001 | McCants | 123/565 |
| 6,324,846 B1 | * | 12/2001 | Clarke | 60/605.2 |
| 6,434,940 B1 | * | 8/2002 | Araujo | 60/606 |
| 6,450,156 B1 | * | 9/2002 | Araujo | 123/565 |
| 6,709,243 B1 | * | 3/2004 | Tan et al. | 417/244 |
| 6,718,955 B1 | * | 4/2004 | Knight | 123/559.1 |
| 6,755,022 B2 | * | 6/2004 | Kim et al. | 60/608 |
| RE38,671 E | * | 12/2004 | Kahlon et al. | 60/605.1 |
| 6,883,324 B2 | * | 4/2005 | Igarashi et al. | 60/608 |
| 6,894,402 B2 | * | 5/2005 | Dubus et al. | 290/40 C |
| 6,922,995 B2 | * | 8/2005 | Kawamura et al. | 60/608 |
| 6,931,850 B2 | * | 8/2005 | Frank et al. | 60/608 |
| 6,938,420 B2 | * | 9/2005 | Kawamura et al. | 60/612 |
| 6,941,904 B1 | * | 9/2005 | Hofbauer et al. | 123/46 R |
| 6,957,632 B1 | * | 10/2005 | Carlson et al. | 123/46 R |
| 6,968,831 B2 | * | 11/2005 | Kim et al. | 123/568.11 |
| 7,004,115 B2 | * | 2/2006 | Patton | 123/25 C |
| 7,047,743 B1 | * | 5/2006 | Stahlhut et al. | 60/608 |
| 7,076,954 B1 | * | 7/2006 | Sopko, Jr. et al. | 60/607 |
| 7,102,304 B2 | * | 9/2006 | Sebille et al. | 318/108 |
| 7,107,974 B2 | * | 9/2006 | Yang | 123/565 |
| 7,137,253 B2 | * | 11/2006 | Furman et al. | 60/608 |
| 2003/0110770 A1 | * | 6/2003 | Criddle et al. | 60/608 |
| 2003/0110771 A1 | * | 6/2003 | Morgan et al. | 60/608 |
| 2003/0159441 A1 | * | 8/2003 | Kim et al. | 60/608 |
| 2004/0168440 A1 | * | 9/2004 | Tsuzuki et al. | 60/606 |
| 2005/0050887 A1 | * | 3/2005 | Frank et al. | |
| 2005/0139175 A1 | * | 6/2005 | Kim et al. | 123/27 R |
| 2006/0053788 A1 | * | 3/2006 | Furman et al. | 60/608 |
| 2006/0162333 A1 | * | 7/2006 | Isogai | 60/601 |
| 2006/0230759 A1 | * | 10/2006 | Semrau | 60/602 |
| 2007/0062191 A1 | * | 3/2007 | Furman et al. | 60/607 |

FOREIGN PATENT DOCUMENTS

| | | |
|---|---|---|
| DE | 28 08 147 A1 | 8/1979 |
| DE | 198 23 274 C1 | 10/1999 |
| DE | 100 40 122 A1 | 2/2002 |
| EP | 0 837 231 A2 | 4/1998 |
| GB | 2 292 587 A | 2/1996 |
| JP | 2002 357127 | 4/2003 |

* cited by examiner

SUPERCHARGER COUPLED TO A MOTOR/GENERATOR UNIT

FIELD OF THE INVENTION

This invention concerns a device to handle and recover the kinetic energy in a fluid.

PRIOR ART

The current state of technique relevant i.e. to the internal-combustion engine boosting, generally makes use of mechanical systems such as turbo superchargers or mechanical drive positive displacement blowers. These devices compress and meter the air delivered to the engine using an approximate method which is inconsistent with the engine needs. This is caused by inaccurate driving devices, by high inertias or by lacking power at a certain speed (rpm) or excessive power at other speeds.

Any other engine subsidiary system is almost completely electronically driven, due to performances reasons and needs set by problems relevant to energy consumption and environment preservation.

However, the need for an air handling system has not yet been met: throughout the world many attempts are currently being made to meet this need, making use either of an electrically driven external device to avoid turbo superchargers classic response delay or making use of electric engine supported turbo superchargers. As a part of it, the electrical engine is stressed by the same speed (rpm) and the same temperature as the turbo supercharger.

DETAILED DESCRIPTION OF THE INVENTION

Figure 1:
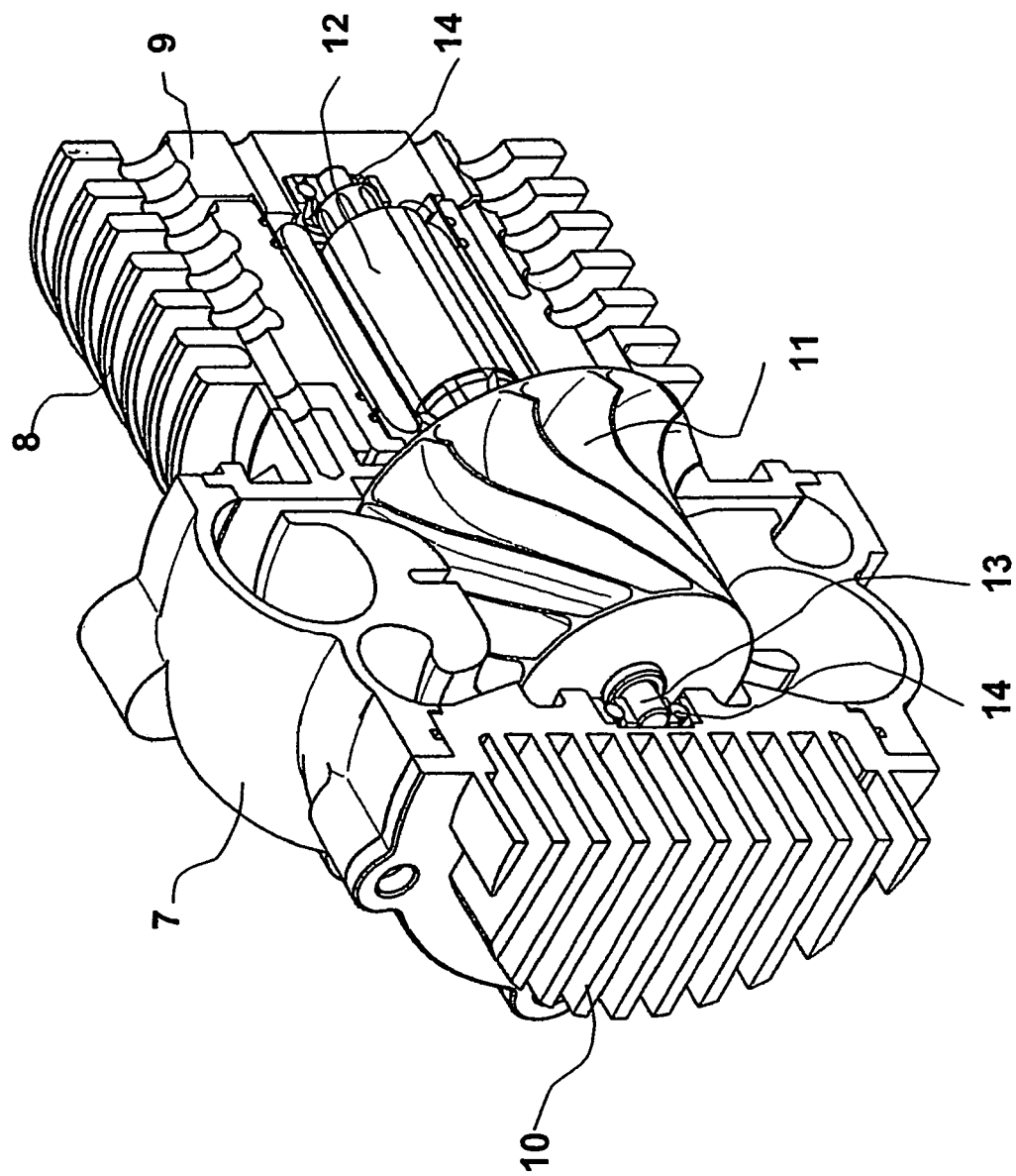
FIG. 1 shows a three-dimensional section plane of the reversible bladed impeller that is the subject of this invention.
Figure 2:
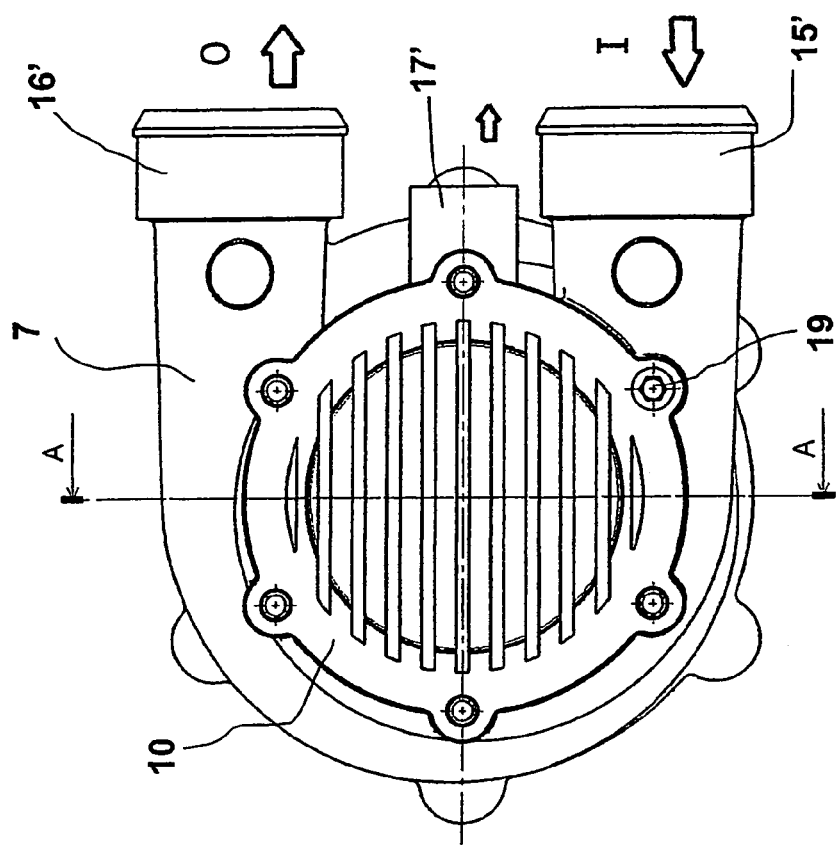
FIG. 2 shows a front view.
Figure 3:
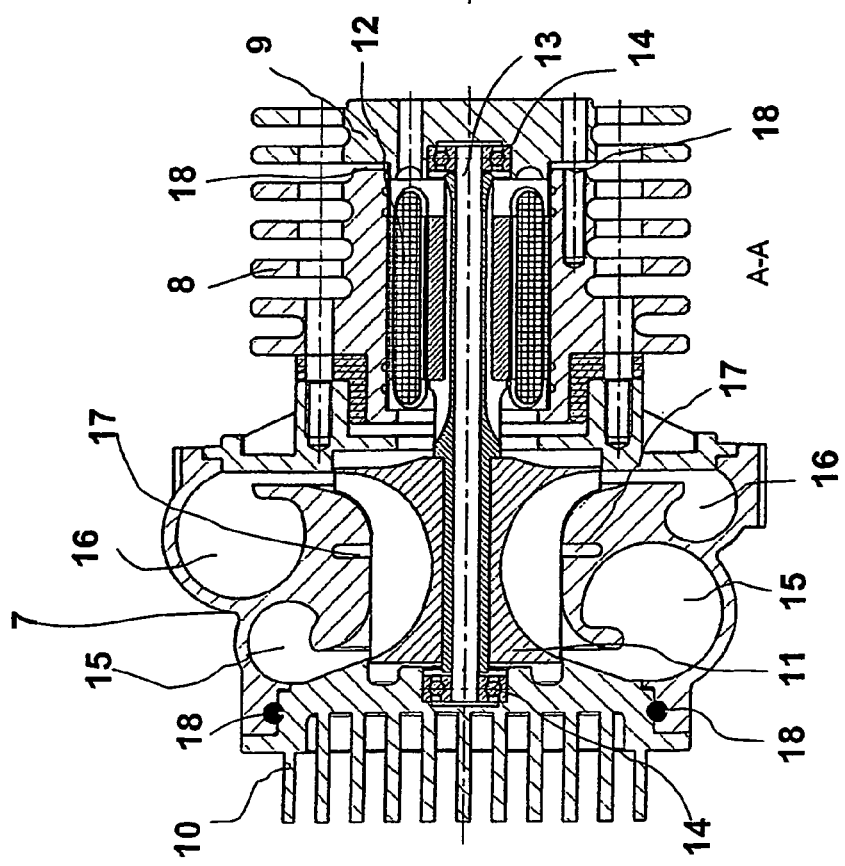
FIG. 3 shows an A-A longitudinal section.
Figure 4:
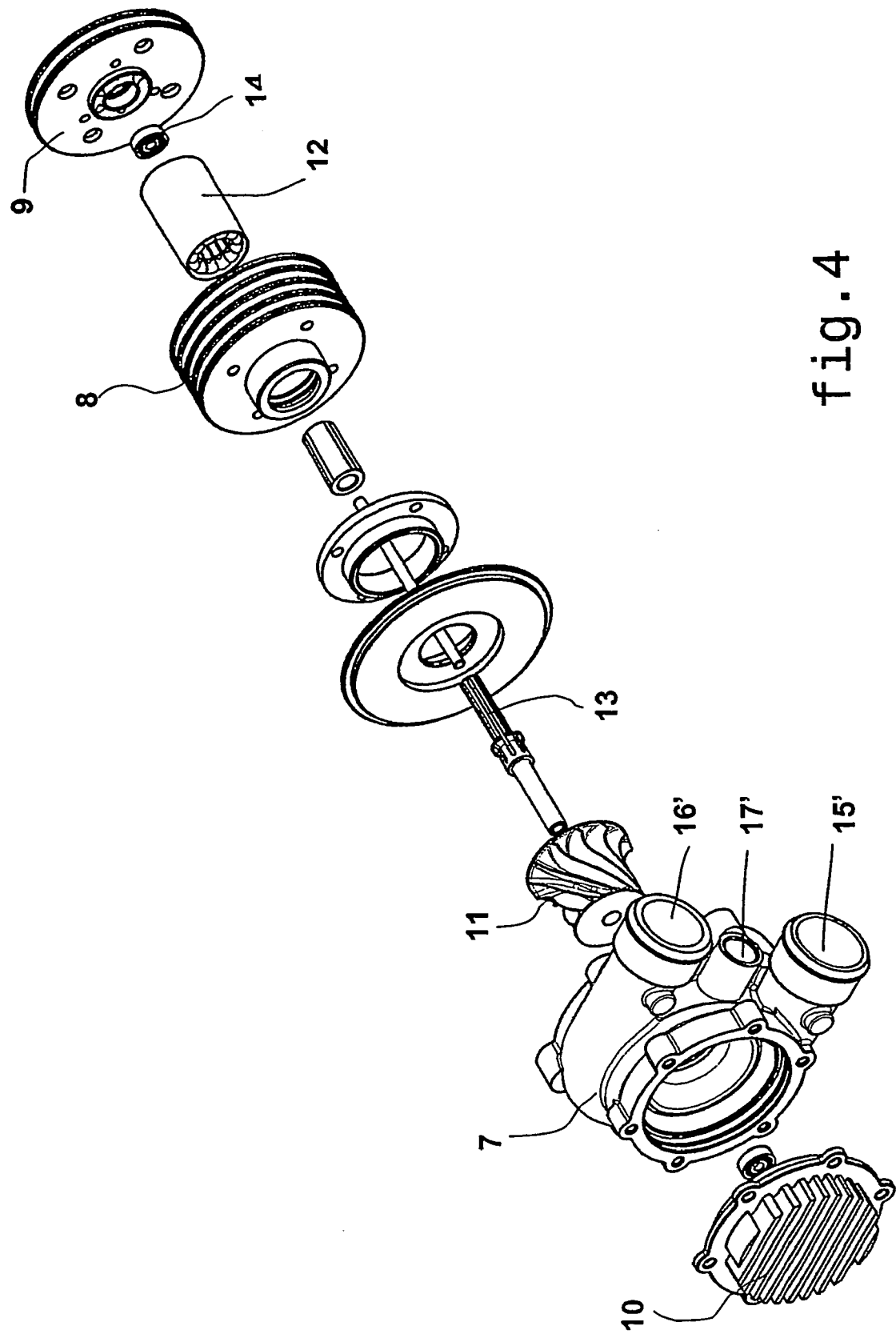
FIG. 4 shows a three-dimensional exploded view.

The purpose of this invention is to overcome all the over mentioned inconveniences introducing a reliable device to completely handle and recover the excessive kinetic energy in a fluid. It optimally meets fluid handling needs, an essential step for obtaining engine cleaner combustions.

In particular, the device is made of a reversible bladed impeller, an electrical engine/generator integral with the impeller and a fluid conveyor cooperating with the impeller and the engine supercharging fluid.

It is a particular subject of this invention a device as described in the claims that are an integral part of this description.

The device subject matter of the invention shows several advantages.

Among its features are fluid mechanics reversibility and fast operating time. It is especially compact and simple; pressure and air flow can be set with accuracy. Particularly fit to operate as autonomous blower and as a device to recover energy otherwise lost.

It can be applied to cars or on internal combustion engines of road trailers boosted through exhaust gases turbo compressor.

It can be applied to aeronautics, on aviation piston engines.

Other applications are in marine, commercial, stationary engines and so on.

It can also be used on two-stroke-cycle engines as separate blower in a sealed case engine or used on already available engines.

Beside engines, it can be used in any duct where there is the need to handling a fluid (gas or liquid) kinetic energy, its pressure and/or air flow surging, and so on with a small loss of pressure and fast operation time.

Applying the device to internal combustion engines there are also outstanding ecology, environment and energy consumption related advantages such as reduction of oxygen shortage grade of smoke, less energy drawing from the driving shaft due to the possibility of reducing or removing the conventional alternator and relevant rather inefficient belt or gear drive.

Further purpose and advantages of this invention can be easily understood from the following detailed description of a non limiting exemplifying embodiment example thereof and the annexed drawings.

Below follows the description of the device, with reference to pictures 1 to 4.

The same reference numbers or letters in the figures identify the same parts, elements or magnitudes.

The device includes a fixed and a movable part.

The fixed part includes a casing, preferably aluminum alloy casting and plentifully finned to ease cooling, obtained from the assembly of a fluid conveyor 7, a casing of the engine/generator 8 equipped with cooler and a rear cover 9. There is also a front cover with relevant cooler 10.

These parts are joined with suitable screws 19 and sealed using rubber ring seals (18).

For practical reasons and in order to allow the assembly of the bladed impeller inside the conveyor 7 independently from its diameter, the conveyor may be split in two parts to be joined.

The fluid conveyor 7 includes internally: a converging spiral of the fluid input 15 with relevant inlet 15', a diverging spiral of the fluid output 16 with relevant outlet 16'; a duct 17 and relevant drain plug 17' for recirculation or partial fluid drain.

The moving part is made of a bladed impeller 11 integral with an engine/generator 12 by means of a steel shaft 13 supported by high speed sealed antifriction bearings, not needing forced lubrication. The bearings 14 are mounted at the two ends of the shaft 13 and are inserted in the two covers 9 and 10.

The bladed impeller is inside the conveyor 7 and works with the inlet 15, the outlet 16 and the duct 17 as follows.

The device works by means of the fluid dynamic reversibility of the impeller 11 and by means of the engine/generator 12 reversibility (brushless to be preferred), working either as an engine or a generator.

The fluid conveyed and accelerated by the converging spiral of the fluid input 15 with relevant inlet 15', operates on the flow impeller blade leading edges and profiles.

If the impeller is slowed down the fluid expands, lowers its temperature and looses pressure, conveying mechanical power to the engine/generator 12 that works now as an electric generator.

Should the output pressure be still very high, recirculation or the partial exhausting of the air through a duct 17 with relevant drain plug 17' is provided. The drain plug 17' can be jointed to a proper choke valve (no. 6 in picture 5)

On the contrary if the fluid at the inlet 15' is low on energy, at low pressure and flow rate, proper sensors will actuate an electronic control unit (not shown in the figures) to supply the engine/generator 12, now working as an engine, with electrical power, as per its needs. The impeller accelerates and the blade profile next to the trailing edge operates as an efficient centrifugal blower pushing the fluid to the diverging spiral of the fluid output 16. Afterwards the fluid is sent with suitable pressure to the user device through the outlet 16'.

The lack of operational delays is very important as well; immediate response is due to the very low inertia of the actuator as the lightweight rotating parts are always rolling at a speed near the operating one.

Therefore the device features mechanical fluid reversibility, the ability of handling pressure and capacity, can operate as an autonomous blower and recovers energy otherwise wasted.

Shape, size and power of the device are accommodated according to its use.

As an embodiment example, the engine/generator 12 is a three-phase synchronous electrical machine, with a high efficiency brushless permanent magnet that, operating as an engine, is supplied with a variable high frequency three-phase alternate current obtained converting direct current in an electronic circuit connected to the actuator. As a generator its output is three-phase alternate current rectified by means of silicon diodes.

This is a type of low maintenance engine/generator used as high power fast alternator (typical 50,000 rpm) with reduced dimensions, weight and cost. Any available type of rectifying and conversion electronic circuits can be used.

Benchmark test results are exciting either in compressor or in generator mode. An approx. 60 mm impeller and a 2 kg total device weight can develop an electrical power that compares to the one of an average car alternator. There is no power loss in the main engine because all the exploited energy comes from the exhaust gas and would have been otherwise wasted through the waste gate or due to the turbo supercharger "variable geometry" system.

Thus, the device subject of the invention can substitute the classic alternator of an ordinary engine, which weights an average 5 to 8 kg resulting in a great improvement in performance, weight and costs.

Figure 5:
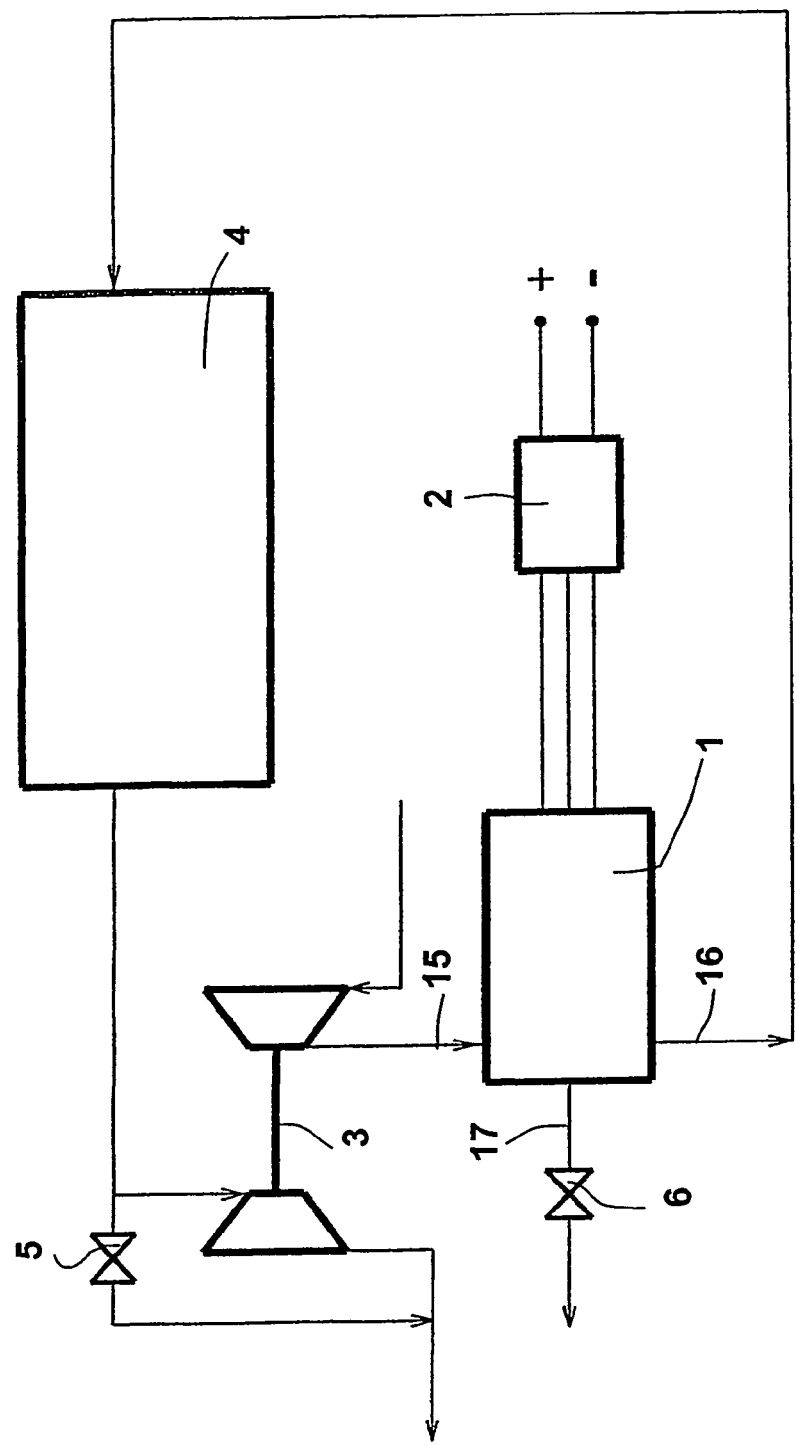
FIG. 5 shows the diagram of the application of the device to an engine system.

The device can be used for many applications. In the following there is a description of some applications to engines, with reference to FIG. 5 schematic diagram.

No. 4 in picture 5 shows a generic engine such as a road trailer internal combustion engine, boosted by turbo supercharger 3 and receiving the exhaust gas coming from the engine 4 equipped with waste gate 5. Device 1, subject of the invention, is in series with the turbo supercharger from which it receives the fluid (the compressed air) that is then driven to the inlet 15. The outlet 16 supplies the compressed air intake to the engine 4. Device 1 is better put after the intercooler, if any.

Recirculation or partial fluid exhaust duct 17 goes to a special choke valve 6.

An electronic converter/rectifier 2 for engine/generator 12 of known type is provided, interfacing as known with the control unit that supervises any other engine function.

In automotive application on road trailer internal combustion boosted with exhaust gas turbo supercharger engines, the device subject-matter of the invention is able of filling supercharging gaps that are typical of transient conditions. It "serially" pressurizes the air at the main turbo supercharger (as in two-stage compressors), increasing the torque at low rpm and reducing the grade of smoke due to air shortage. It also reduces the exceeding supercharge pressure delaying the opening of the waste gate and resulting in a greater use of the energy otherwise wasted in exhausted gases.

In aviation application on piston engines, the device subject-matter of the invention can be used to restore the power over the full-throttle height. Under this height, being the aviation engine a constant revolution one, it would operate as a supercharge pressure automatic limiter to avoid thermal and mechanical stress of the main engine. In the mean time it operates as main generator; the classic alternator becoming an auxiliary device in a flexible and redundant system. The pressure control would be disabled during take off or in case of emergency.

The device can also be used with any kind of internal combustion engine (even marine, commercial, two-stroke cycle either Otto engines or diesel engines such as uniflow type engine as separate blower and/or scavenging blower at start up of an hypothetical sealed casing engine) giving clear benefits in terms of ecology, environment and energy consumption, oxygen shortage grade of smoke reduction, as well as benefits due to lesser drawing from the driving shaft thanks to the possibility of reducing or removing the conventional alternator and relevant rather inefficient belt or gear drive.

In four-stroke cycle aspirated engines the device can act usefully as a compressor to get a slight boost.

Furthermore, the device can be easily applied to any commercially available engine.

Beside engine, the device subject-matter of the invention can be applied to any system containing pressurized or moving fluids or to any duct requiring kinetic energy handling of a fluid (gas or liquid) and relevant pressure and/or delivery surging, etc. with small loss of pressure and fast operation time.

Design variations of the above example can be carried out, without going out of the protection scope of this invention, including any equivalent embodiment for a technician skilled in the art.

As an example, in case of huge diameter flow impellers or dense fluids it is possible to use a brush three-phase or single-phase engine/generator 12, slower than brushless ones or a direct current generator/engine.

The making of the device may require materials such as stainless steel, titanium o even ceramic in case of corrosive and/or hot fluids. Composite materials such as techno polymers fiber reinforced may be used in case of cold fluids.

A technician skilled in the art can manufacture the subject of the invention from the above description with no need of further constructive details.

The invention claimed is:

1. A device for handling and recovering kinetic energy in a turbocharged engine, comprising:
    a bladed impeller;
    a reversible engine/generator coupled to the bladed impeller;
    a fluid conveyor containing the impeller, which co-operates with the impeller to handle and recover the kinetic energy of incoming fluid, the fluid conveyor comprising a convergent spiral of a fluid inlet configured to receive an incoming fluid from a turbocharger compressor turbine output and a divergent spiral of the fluid outlet configured to output said fluid to an engine intake;

wherein the bladed impeller is formed with a single series of blades, and wherein said single series of blades are configured to both (1) drive the fluid from the fluid inlet to the fluid outlet when the reversible engine/generator is acting as an engine, and (2) be driven by fluid flowing from said fluid inlet to said fluid outlet when the reversible engine/generator is acting as a generator.

2. The device of claim 1, wherein said fluid conveyor includes a duct for recirculation or partial exhaust of excess fluid.

3. The device of claim 1, wherein said engine/generator is integral with the bladed impeller by means of a shaft.

4. The device of claim 1, wherein said engine/generator is a high efficiency permanent magnet brushless electric three-phase synchronous machine which is supplied, as an engine, with alternate three-phase variable high frequency current, and outputs as a generator, an alternate three-phase current.

5. The device of claim 1, wherein the device is a single body and further comprises:
   an engine/generator casing having a first cooler;
   a rear cover integral with the casing; and
   a front cover having a second cooler, integral with the fluid conveyor, said single body containing the engine/generator, and the bladed impeller.

6. The device of claim 5, wherein said engine/generator is integral with the bladed impeller by means of a shaft, and wherein said shaft is inserted in the front and rear covers by means of antifriction bearings.

7. The device of claim 1, in which said device is made of aluminum alloy or stainless steel or titanium or ceramic material or composite materials such as fiber reinforced techno polymer.

8. An Overcharged engine including a turbo supercharger, comprising a device as in any of the previous claims, assembled in series between said turbo supercharger and the fluid inlet.

9. The engine of claim 8, for use on a road trailer.

10. The engine of claim 8, for use on an airplane.

11. The engine of claim 8, for use on a ship.

12. The engine of claim 8, wherein it is a two-stroke-cycle internal combustion engine.

* * * * *